United States Patent [19]

Temple

[11] Patent Number: 4,584,577
[45] Date of Patent: Apr. 22, 1986

[54] ANGULAR POSITION SENSOR

[75] Inventor: Andrew W. Temple, Milford-on-Sea, Lymington, England

[73] Assignee: Brookes & Gatehouse Limited, England

[21] Appl. No.: 542,659

[22] Filed: Oct. 17, 1983

[30] Foreign Application Priority Data

Oct. 20, 1982 [GB] United Kingdom ............... 8230004

[51] Int. Cl.$^4$ .............................................. G08C 19/06
[52] U.S. Cl. ......................... 340/870.32; 74/471 XY; 324/208; 336/45; 33/1 N; 33/1 PT
[58] Field of Search ................... 336/45; 340/870.32, 340/870.33, 870.35; 200/6 A; 74/471 XY; 33/1 N, 1 PT; 324/208, 207

[56] References Cited

U.S. PATENT DOCUMENTS

| | | | |
|---|---|---|---|
| 3,024,409 | 3/1962 | Brown | 340/870.32 |
| 3,217,308 | 11/1965 | Maxwell, Jr. | 340/870.32 |
| 3,250,982 | 5/1966 | Bowie | 340/870.35 |
| 3,365,975 | 1/1968 | Hathaway | 74/471 XY |
| 3,509,469 | 4/1970 | Strange | 340/870.32 |
| 3,641,429 | 2/1972 | Cox, Jr. | 340/870.33 |
| 3,699,558 | 10/1972 | Hendley | 340/870.32 |
| 3,861,763 | 1/1975 | Perkins | 74/471 XY |
| 4,013,911 | 3/1977 | Fujiwara | 340/870.35 |
| 4,401,986 | 8/1983 | Trenkler | 340/870.32 |

FOREIGN PATENT DOCUMENTS

| | | |
|---|---|---|
| 908523 | 10/1962 | United Kingdom . |
| 980487 | 1/1965 | United Kingdom . |
| 1032084 | 6/1966 | United Kingdom . |
| 1222028 | 2/1971 | United Kingdom . |
| 1265461 | 3/1972 | United Kingdom . |

Primary Examiner—John W. Caldwell, Sr.
Assistant Examiner—Michael F. Heim
Attorney, Agent, or Firm—Henry R. Lerner

[57] ABSTRACT

An angular position sensor comprising a generator coil driven by an oscillator to provide an alternating magnetic field which is symmetrical about an axis, an annular rotor of electrically-conductive or magnetic material such that it distorts the magnetic field around it and arranged so that it is asymmetrical about its axis of rotation and lies outside the equatorial plane of the magnetic field and two sensing coils disposed within the magnetic field. As the rotor 16 rotates about its axis the emfs induced in the sensing coils vary in dependence upon the angular position of the rotor relative to the axis of the undistorted magnetic field.

12 Claims, 7 Drawing Figures

ANGULAR POSITION SENSOR

BACKGROUND OF THE INVENTION

The present invention relates to electromagnetic devices for determining angular position, for example, the angular position of a rotary shaft or joystick or of an incoming electromagnetic wave at a receiver.

A number of conventional devices for determining angular position incorporate AC synchros. However, these have the disadvantage that their construction is relatively complex, requiring a rotating electromagnetic coil and sliding contacts. Consequently, such devices tend to be unreliable and, due to the fact that the moving and stationary parts are mechanically coupled, are not suited to application where robustness and low frictional torque are desirable, for example, in determining incident wind direction on board ship.

Other known devices for determining the angular position of a rotating body use optical or capacitive sensing techniques. However, such devices are adversely affected by environments with a high moisture content such as are found on board ship and, as they cannot be adequately sealed against the entry of moisture due to the low torque requirement, are not, therefore, suited to marine applications.

These difficulties have been overcome, to a certain extent, by using potentiometric sensing devices. However, such devices can only be made using specialist techniques and their manufacture frequently requires heavy investment in specialized plant.

SUMMARY OF THE INVENTION

It is an object of the invention to provide an angular position sensor which can be adapted to fulfil a variety of functions.

It is a further object of the invention to provide an improved angular position sensor which is simple in construction, robust and has low frictional torque.

It is a still further object of the invention to provide a reliable angular position sensor which can be manufactured cheaply and without specialized machinery.

In a first aspect, the invention provides an angular position sensor comprising:

means for generating an alternating magnetic field which is symmetrical about an axis;

a rotatable body asymmetrical about its axis of rotation and lying outside the equatorial plane of said field; and said rotatable body being of material such that said field is distorted around it so that, in use, the emf induced in said sensing coil by said field is dependent on the angular position of said rotatable body relative to the axis of the symmetry of the undistorted field.

In a further aspect, the invention provides apparatus for sensing the angular position of a rotatable member; comprising a generator coil drivable to provide an alternating magnetic field symmetrical about a central axis of said generator coil and arranged so that said central axis coincides with the axis of rotation of said rotatable member;

a sensing coil arranged so that its central axis is orthogonal to that of the generator coil; and a body of material capable of distorting a magnetic field and coupled for rotation with said rotatable member said body lying outside the planes containing said generator and sensing coils so that the electromagnetic coupling between said generator and sensing coils is dependent on the angular position of said rotatable member about its axis of rotation.

In a still further aspect, the invention provides joystick control means comprising;

a generator coil drivable to provide an alternating magnetic field symmetrical about a central axis of said generator coil;

a sensing coil arranged so that its central axis is orthogonal to that of said generator coil;

a body of material capable of distorting a magnetic field;

gimbal mounting means for mounting said body, and joystick means coupled to said body whereby said body is movable about a fixed centre from a neutral position in which said body is disposed in the plane of said generator coil;

the electromagnetic coupling between said generator and sensing coils being dependent on the position of said joystick means relative to said neutral position.

As the magnetic coupling and hence the coil output of the device are dependent on the angular position of the body relative to the axis of symmetry of the undistorted magnetic field, the device can be utilized in two different ways.

Either the magnetic field may be held stationary, while the body is rotated with the object whose angular position is to be monitored or the body may be held stationary and the field rotated. As a result, the device is versatile and can fulfil a number of different functions.

The body may be mounted for rotation with a member whose rotational axis coincides with the axis of symmetry of the undistorted magnetic field and in which the means for generating the magnetic field is a fixed coil; the emf induced in the or each sensing coil being related to the angular position of the body about its axis of rotation.

With this arrangement, the device can replace conventional AC synchros with the advantage that its construction is simple and does not require a rotating coil or sliding contacts. Because there is no mechanical coupling between the moving and stationary parts of the device, it is particularly well-suited to applications requiring low frictional torque.

Due to its relatively simple construction, the angular position sensor of the invention is robust and can be manufactured cheaply and without specialized machinery.

Alternatively, the body may be mounted in a gimbal so as to be movable with a joystick about a fixed centre, the means for generating the magnetic field being a fixed coil; the emf induced in the or each sensing coil being related to a neutral position in which the body is disposed in the plane of the generator coil.

Joystick controls of this kind are important in the fields of, for example, computer aided design and industrial robots and the joystick control of the invention is particularly advantageous in that it is almost completely free of backlash and static friction. It is also capable of being sealed completely without involving a great deal of additional expense.

BRIEF DESCRIPTION OF THE DRAWINGS

Embodiments of the invention will now be described in detail, by way of example, with reference to the drawings, in which.

DETAILED DESCRIPTION OF THE PREFERRED EMBODIMENTS

Figure 1:
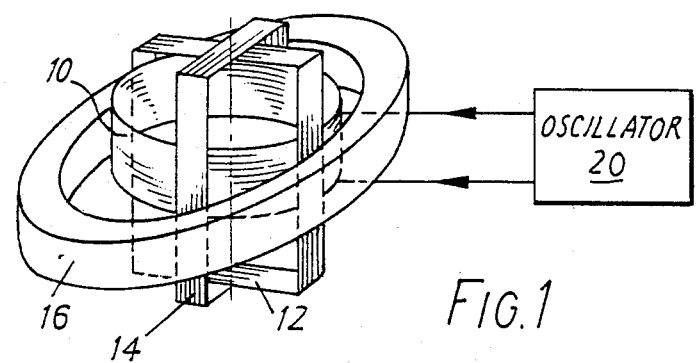
FIG. 1 shows an angular position sensor in accordance with the invention.

The angular position sensor shown in FIG. 1 comprises an electromagnetic coil 10, for generating an alternating magnetic field, a pair of sensing coils 12 an 14, and a body or rotor 16 in the form of an inclined annulus.

Figure 2:
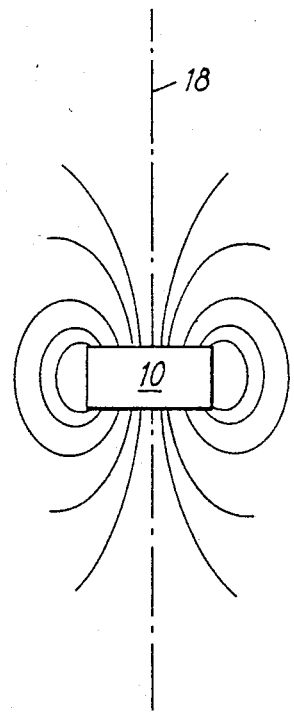
FIG. 2 shows the undistorted magnetic field generated in the device of FIG. 1.

An oscillator 20 is connected to drive the circular generator coil 10 so that it produces an alternating symmetrical magnetic field as is shown in section in FIG. 2. The oscillator frequency is chosen to minimize radio interference. Suitable frequencies range from 500 KHZ to several MHZ. A frequency of 1.6 MHZ is sufficiently low to allow simple circuit techniques to apply but is high enough to allow low-value and, hence, small-size components to be used in the electronic circuits associated with the device.

The sensing coils 12 and 14 are identical to one another and are arranged so that the planes containing the coils 12 and 14 are perpendicular to one another and to the plane containing the generator coil 10. With this arrangement, the axis of symmetry 18 of the magnetic field produced by the generator coil 10 lies within the planes bounded by the coils 12 and 14 and, in the absence of the rotor 16, no emf is induced in either sensing coil 12 or 14 by the alternating magnetic field.

Figure 6:
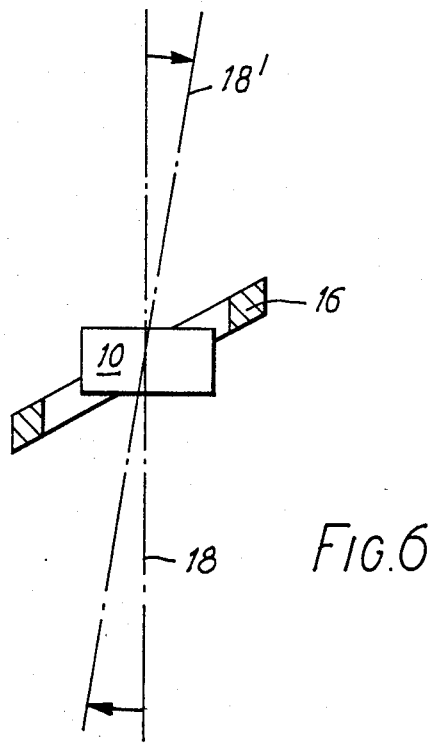
FIG. 6 shows the effect of an electrically-conducting rotor on the magnetic field direction of FIG. 2.

The rotor 16 takes the form of a planar body, in this instance, an annulus. The annular rotor may be of either magnetic or electrically-conductive material but it is preferred to use an electrically-conductive rotor for ease of manufacture. The rotor 16 of FIGS. 1 and 6 is formed, for example, by a ring cut from a piece of copper tubing at an angle to its axis.

Figure 3:
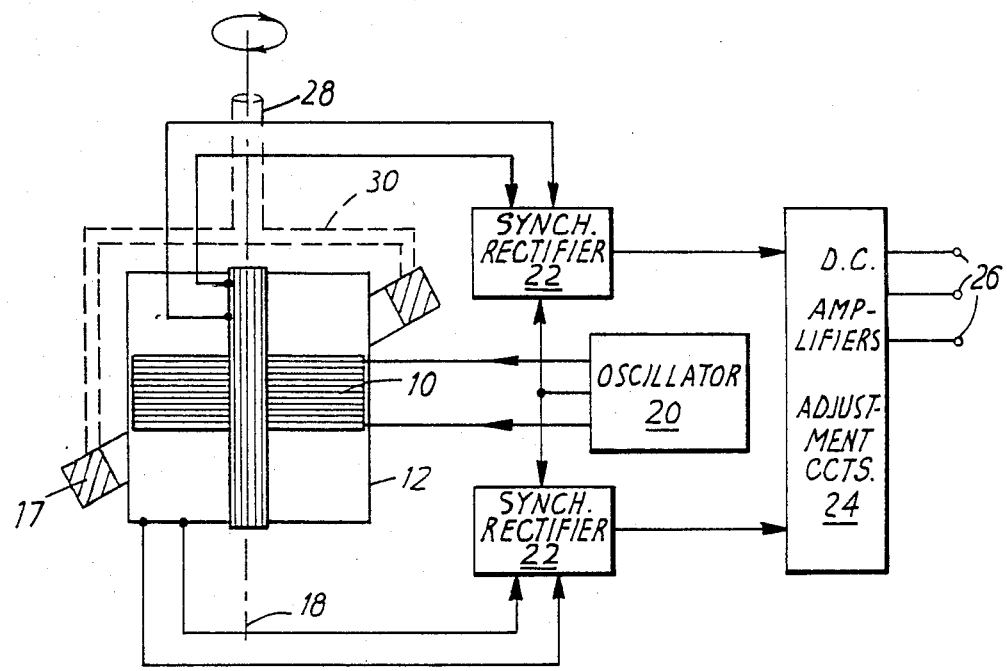
FIG. 3 shows the device of FIG. 1 modified to indicate the angular position of a rotary shaft.
Figure 4:
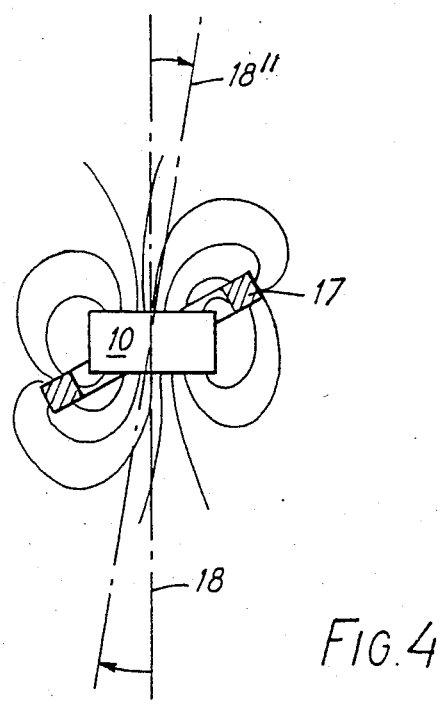
FIG. 4 shows the effect of the magnetic rotor on the magnetic field of FIG. 2.

FIG. 3 shows how the angular position sensor of the invention can be modified to monitor the angular position of a rotary shaft 28 (indicated in dotted lines in FIG. 3) using a magnetic rotor 17 of ferrite or iron powder. The rotor 17 is mounted on the end of the shaft 28 by means of a suport 30 so that it is symmetrical about the shaft 28 and inclined to the plane of the generator coil 10. The shaft 28 is positioned so that its longitudinal axis coincides with the axis of symmetry of the undistorted magnetic field. The rotor 17 is of ferromagnetic material and thus provides a magnetic path of lower reluctance than the surrounding air. As a result, the magnetic field is distorted around the rotor 17 as shown in FIG. 4. The support 30 is of non-magnetic material so that it does not itself cause any distortion of the magnetic field.

As the shaft 28 rotates, the rotor 17 and, hence, the axis 18″ of the distorted magnetic field rotate with it. The electromagnetic coupling between the magnetic field and the sensing coils gives rise to an output signal from each of the coils 12 and 14 which varies as the shaft 28 rotates.

If the physical parameters of the device are suitably adjusted, the outputs of the sensing coils 12 and 14 are sinusoidal and may be made proportional to the sine and cosine, respectively, of the angle through which the rotor 17 has rotated from the position shown in FIG. 3. In this way, the outputs of the sensing coils 12 and 14 give a unique indication of all angular positions from 0° to 359° of the rotor 17 relative to the axis 18 of the undistorted field and, hence, relative to its axis of rotation.

As the rotor 17 performs a single revolution the phase of the output signal in each sensing coil 12 or 14 reverses. The sensing coil outputs are, therefore, applied to a pair of synchronous rectifiers 22 which compare the phase of each sensing coil output signal with the phase of the output of the oscillator 20 and produce a DC signal of the correct polarity and of a magnitude corresponding to the amplitude of the sensing coil output. The DC signals are then amplified and passed through correcting circuits 24 to the output terminals 26 of the device. Since errors in the output of the sensing coils 12 and 14 occur if the coils 10, 12 and 14 are not precisely positioned relative to one another, the correcting circuits 24 are included to provide electrical correction of these errors and, thus, avoid the need for a complex movable coil assembly. The correcting circuits 24 include conventional means for compensating the zero offsets which arise when the sensing and generator coils are not precisely orthogonal and for adjusting the output to take into account the errors in the output due to a lack of orthogonality between the sensing coils 12 and 14 and for an unbalanced output between them. The correcting circuits 24 enable the device to detect angular positions to an accuracy of better than 1°.

Alternatively, the output of the device may be adjusted to take into account errors due to lack of orthogonality by means of a small movable toroidal or cylindrical ferrite core within the device with its central axis of symmetry coincident with the axis of the undistorted magnetic field.

As there is no mechanical connection between the shaft 28 and the sensing coils 12 and 14, the device can be used to monitor continous rotation of the shaft 28 in either direction.

As mentioned above, the lack of frictional contact between the rotor 17 and the stationary parts of the device renders the device particularly well-suited to applications where low torque is desirable as is the case in determining incident wind direction. The device can be adapted to fulfil this function by mounting a suitable vane on the shaft 28 so that the shaft is caused to rotate until it is aligned with the wind direction. The output of the sensing coils 12 and 14 then provides a direct and continuous indication of the incident wind direction.

Figure 5:
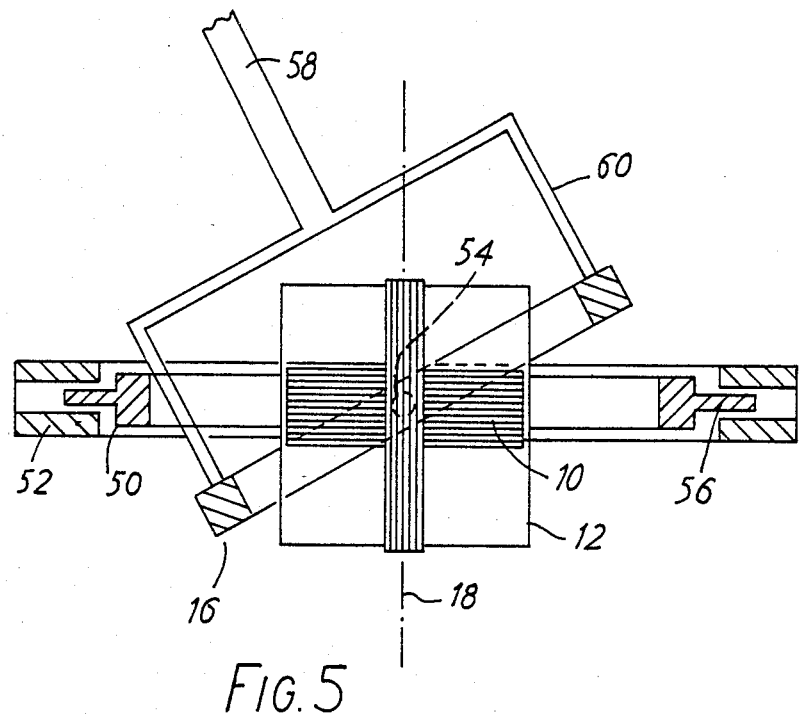
FIG. 5 shows the device of FIG. 1 modified to act as a two-axis joystick controller.

FIG. 5 shows how the device of FIG. 1 can be adapted to function as a joystick controller. The annular rotor 16 is mounted in conventional gimbal rings 50 and 52. The rotor 16 is secured to the inner ring 50 by means of pivot mountings 54 so that it is pivotable about a diameter and the inner ring 50 is secured to the outer ring 52 in a similar manner by means of pivot mountings 56. The pivot axes of the rotor 16 and of the inner ring 50 are orthogonal so that the rotor 16 can be tilted and pivoted about a central axis. The gimbal rings may be replaced by any other known gimbal or ball-joint mounting which provides a suitable degree of movement.

The rotor 16 is secured to a joystick 58 by means of a mounting fork 60. When the joystick 58 is in a central, neutral position the central axis of the annular rotor 16 coincides with the axis of symmetry of the magnetic field produced by the generator coil 10. In this position, the rotor 16 does not have any effect on the direction of the magnetic field and no emf is induced in the sensing coils 12 and 14.

If the joystick 58 is moved out of the neutral position, the rotor 16 tilts out of the plane of the gererator coil 10 (for example, as shown in FIG. 5). Eddy current effects in the electrically-conductive rotor 16 cause the magnetic field around the rotor 16 to be distorted and the axis of the field to tilt to the position 18' as shown in FIG. 6.

As a result, the axis of symmetry of the magnetic field tilts to the position 18' indicated in FIG. 6 so that it is no longer within the plane of the coil 14. The tilted magnetic field has a component in a direction perpendicular to the plane of the sensing coil 14 and the alternating magnetic field induces a corresponding emf in the coil 14. As the rotor 16 rotates around the axis 18, the skewed axis 18' rotates with it, so that unless the rotor 16 is symmetrical about one or other of the sensing coils 12 or 14, the alternating field induces emfs in both sensing coils 12 and 14. The magnitude of the sensing coil outputs provides an indication of the inclination of the rotor 16 to the plane of the generator coil 10 and the ratio of the two output signals provides an indication of the angular position of the rotor about the undistorted magnetic field axis.

The controller can easily be adapted to produce a three-phase output so that it is compatible with other three-phase equipment by providing three sensing coils at 120° to one another instead of the two orthogonal sensing coils described above. Alternatively, and more cheaply, the two-phase output of the joystick controller shown in the drawings can be converted externally to a three-phase signal using conventional matrixing circuitry.

Methods of applying a correction factor similar to those described in relation to the angular position sensor or FIG. 3 may be utilized when the device is adapted for use as a joystick controller.

Figure 7:
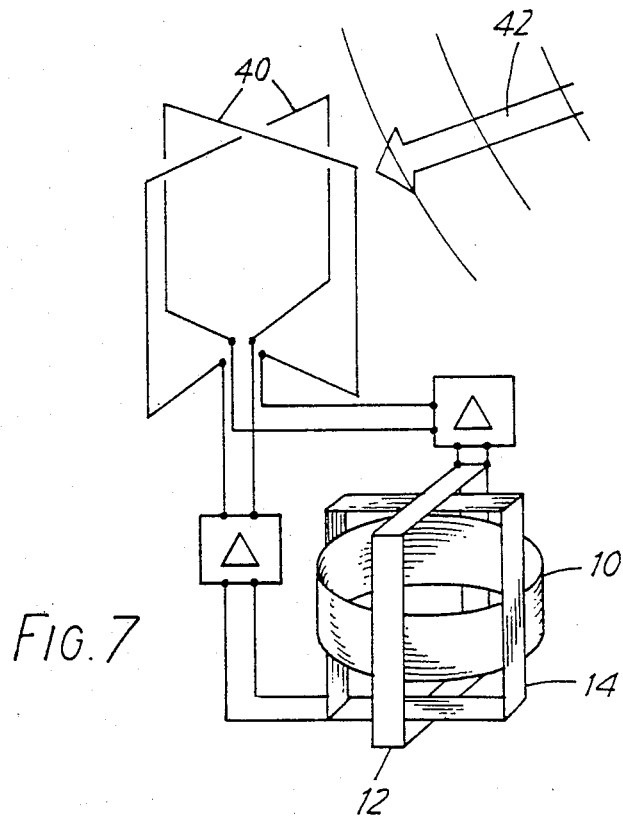
FIG. 7 shows the device of FIG. 1 modified to indicate the incident direction of an electromagnetic signal.

The device shown in FIG. 7 is modified to monitor the direction of an incoming electromagnetic wave. The geometrical arrangement of the coils 10, 12 and 14 is the same as the arrangement shown in FIG. 1 but the functions of the coils are reversed. The output signal from each one of a pair of crossed loop aerials 40 is amplified and applied to one of the coils 12 and 14. The aerials 40 are perpendicular to one another so that the output of each aerial 40 represents the vector component, in one of two perpendicular directions, of an incoming electromagnetic ware 42. When the device is in use, each of the coils 12 and 14 generates an alternating magnetic field of a magnitude proportional to one component of the incoming wave 42. The direction of the resultant magnetic field is, therefore, related to that of the incoming wave. The axis of symmetry of the magnetic field is in the plane of the coil 10, which in the device of FIG. 7 acts as the sensing coil, and, in the absence of the inclined magnetic rotor no emf is induced in the coil 10 by the alternating field. When the inclined rotor is added, the magnetic field is distorted as described in connection with FIG. 4 so that it has a component in a direction perpendicular to the plane of coil 10. As in the device shown in FIG. 1, the output of the sensing coil is related to the angular position of the rotor relative to the magnetic field.

The position of the rotor is adjusted until the output of the coil 10 reaches a null. The angular position of the rotor in the null position then provides an indication of the direction of the incoming wave. When the device is used for direction finding in this way, the coupling efficiency can be improved by providing the device with a fixed internal ferrite core.

In order to render the angular position sensor of the invention even more compact, the rotor may be mounted inside the coil assembly rather than outside it. However, this arrangement is less convenient as it may be necessary to split the sensing coils to allow the shaft to be connected to the rotor.

As is apparent from the description above, an angular position sensor in accordance with the invention is capable of fulfilling a variety of functions and, due to its relatively simple construction, can be compact and robust, and may be manufactured cheaply and by conventional methods.

What I claim is:

1. An angular position sensor comprising:
    a generator coil drivable to provide an alternating magnetic field symmetrical about a central axis of said generator coil;
    a pair of sensing coils arranged so that the plane containing each sensing coil is orthogonal to the plane contianing the other said sensing coil and to that containing said generator coil; and
    a body of electrically-conductive material, at least a part of which is disposed outside the planes containing said generator and sensing coils and which is rotatable about said central axis of said generator coil; the emfs induced in said sensing coils by said magnetic field being dependent on the angular position of said body relative to the axis of symmetry of the undistorted magnetic field.

2. A sensor for sensing angular position about an axis of rotation; the sensor comprising:
    means for generating an alternating magnetic field symmetrical about said axis of rotation;
    a body asymmetrical about said axis at least a part of which lies outside an equatorial plane of said alternating field and extending perpendicular to said axis, the body being of material such as to distort said alternating field so as to provide a resultant field asymmetrical about said axis of rotation; said body being rotatable about said axis of rotation whereby said resultant field is rotatable about said axis; and
    at least one sensing coil disposed within said resultant field; the emf induced in said sensing coil being dependent on the angular position of the resultant field, and, hence, of said body relative to said axis of rotation.

3. The invention set forth in claim 2 wherein said sensing coil is disposed so that the plane containing said sensing coil is parallel to said axis of the alternating magnetic field.

4. The invention set forth in claim 3 including a further sensing coil so disposed that the plane containing said further sensing coil is perpendicular to the plane containing said sensing coil.

5. The invention set forth in claim 2 wherein said rotatable body is of electrically-conductive material.

6. The invention set forth in claim 2 wherein said rotatable body is of magnetic material.

7. The invention set forth in claim 6 wherein said rotatable body is of ferrite.

8. The invention set forth in claim 2 wherein said means for generating said magnetic field is fixed and further including:
   gimbal mounting means for mounting said rotatable body; and
   joystick means coupled to said rotatable body, whereby said body is movable about a fixed centre from a neutral position in which said rotatable body is disposed in the plane of said generator coil;
   the emf induced in said sensing coil being related to the position of said joystick means relative to said neutral position.

9. An angular position sensor comprising:
   receiver means for receiving an electromagnetic signal;
   signal means coupled to said receiver means for generating two output signals each of which represents the vector component of said electromagnetic signal in one of two intersecting inclined directions;
   means for generating an alternating magnetic field; said means for generating including two coils whose central axes are inclined to one another at the same angle as said inclined directions;
   a body rotatable about an axis perpendicular to the plane defined by said intersecting inclined directions; said body being asymmetrical about its axis of rotation; at least a portion of
   said body lying outside said plane and being of material such that it distorts said magnetic field; and
   a sensing coil disposed within said magnetic field; whereby the emf induced in said sensing coil is dependent on the position of said body relative to said magnetic field and, hence, on the direction from which said electromagnetic signal approaches said receiving means.

10. An angular position sensor comprising:
    a generator coil drivable to provide an alternating magnetic field symmetrical about a central axis of said generator coil and defining a first generally planar region;
    a sensing coil disposed such that its central axis is orthogonal to that of the generator coil and defining a second generally planar region; and
    a body, at least a part of which is disposed outside said first and second planar regions containing said generator and sensing coils respectively, and rotatable about the central axis of one of said generator or sensing coils; the body being of material capable of distorting said alternating field to provide a resultant field asymmetrical about said axis of rotation; the electromagnetic coupling between said generator coil and said sensing coil being dependent on the angular position of said resultant field and, hence, of said body about its axis of rotation.

11. An angular position sensor in accordance with claim 10 for sensing the angular position of a rotatable member wherein said body is coupled for rotation with said rotatable member; whereby the electromagnetic coupling between said generator coil and said sensing coil is dependent on the angular position of said rotatable member about the axis of rotation.

12. The invention set forth in claim 11 wherein said member is a shaft and further includes a vane mounted on said shaft whereby said shaft is rotated, in use, by wind incident on said vane; the electromagnetic coupling between said generator and sensing coils being dependent on the incident wind direction relative to said axis of rotation.

* * * * *